(12) United States Patent
Pandey et al.

(10) Patent No.: US 8,669,902 B2
(45) Date of Patent: Mar. 11, 2014

(54) LOCATION ESTIMATION FOR WIRELESS DEVICES

(75) Inventors: Santosh Pandey, Santa Clara, CA (US); Brian Hart, Sunnyvale, CA (US); Ilya Khasin, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 215 days.

(21) Appl. No.: 12/875,680

(22) Filed: Sep. 3, 2010

(65) Prior Publication Data

US 2012/0056786 A1 Mar. 8, 2012

(51) Int. Cl.
*G01S 3/02* (2006.01)
(52) U.S. Cl.
USPC .......................................................... 342/465
(58) Field of Classification Search
USPC .................................... 342/465, 444, 450
See application file for complete search history.

(56) References Cited

U.S. PATENT DOCUMENTS

| | | | |
|---|---|---|---|
| 7,616,555 B2 * | 11/2009 | Hart | 370/203 |
| 7,660,591 B1 * | 2/2010 | Krishnakumar et al. | 455/456.5 |
| 2005/0285793 A1 * | 12/2005 | Sugar et al. | 342/465 |
| 2011/0043407 A1 * | 2/2011 | Moshfeghi | 342/394 |

* cited by examiner

*Primary Examiner* — Harry Liu
(74) *Attorney, Agent, or Firm* — Tucker Ellis LLP

(57) ABSTRACT

In an example embodiment, there is disclosed herein, an apparatus comprising an interface and location determination logic coupled with the interface. The location determination logic receives data representative of measured signal strengths for a wireless device from a plurality of receiving devices at known locations via the interface. The location determination logic determines an estimated location based on the measured signal strengths and a first transmit power for the wireless device. The location determination logic determines a revised transmit power for the wireless device based on the measured signal strengths from the plurality of devices at known locations and the estimated location. The location determination logic determines a revised estimated location based on the measured signal strengths and the revised transmit power for the wireless device.

21 Claims, 2 Drawing Sheets

LOCATION ESTIMATION FOR WIRELESS DEVICES

TECHNICAL FIELD

The present disclosure relates generally to wireless networks.

BACKGROUND

Determining the location estimate of a wireless device can be based on measured signal strength, such as Received Signal Strength Indication (RSSI), Access Point (AP) location, a path loss estimate, and transmit power of the wireless device. In many scenarios, however, the transit power of the wireless device is unavailable. For example, WiFi clients may change their transmit power based on heuristics, or there may be variability and uncertainty in the transmitter of the wireless device. Incorrect estimation of transmit power can lead to location estimation errors.

BRIEF DESCRIPTION OF THE DRAWINGS

The accompanying drawings incorporated herein and forming a part of the specification illustrate the example embodiments.

OVERVIEW OF EXAMPLE EMBODIMENTS

Figure 1:
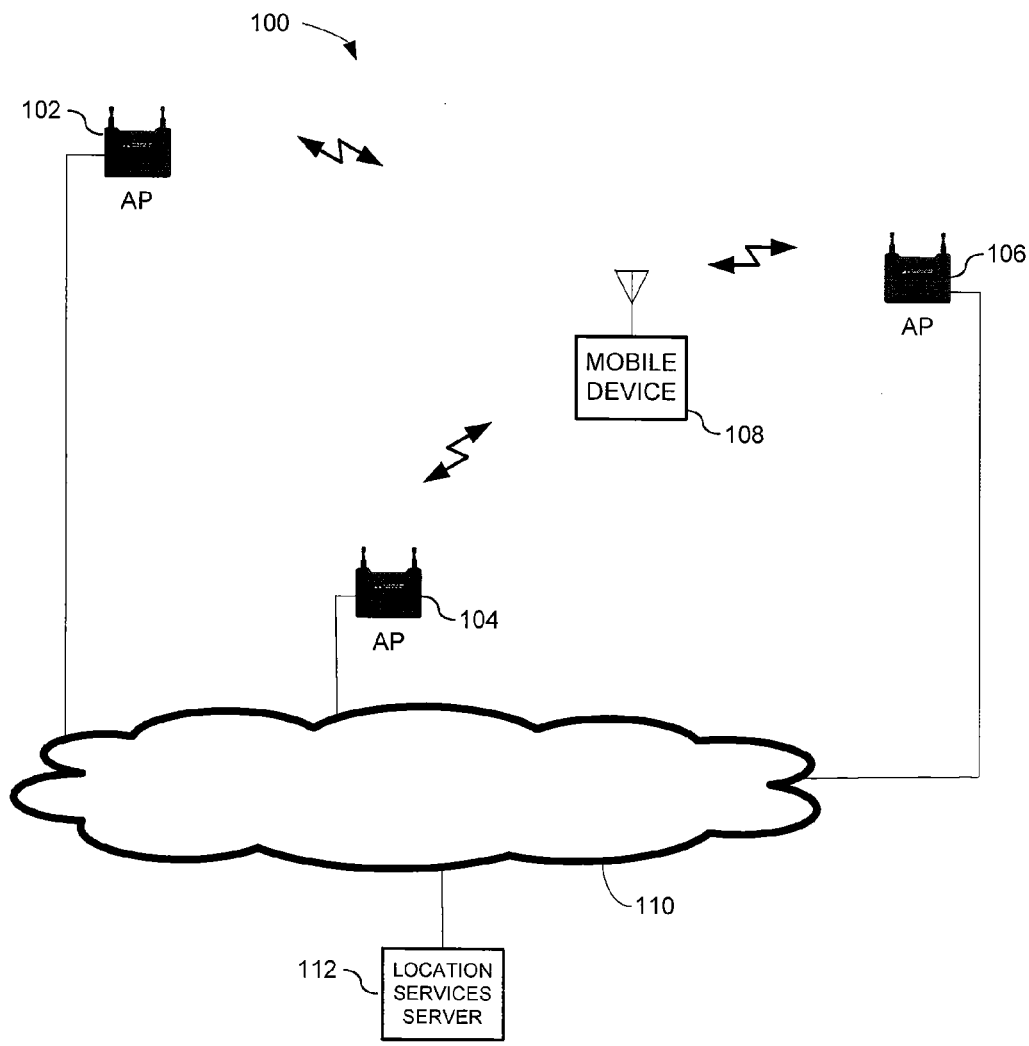
FIG. 1 illustrates a block diagram of a network upon which an example embedment may be implemented.

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with an example embodiment, there is disclosed herein, an apparatus comprising an interface and location determination logic coupled with the interface. The location determination logic receives data representative of measured signal strengths for a wireless device from a plurality of receiving devices at known locations via the interface. The location determination logic determines an estimated location based on the measured signal strengths and a first transmit power for the wireless device. The location determination logic determines a revised transmit power for the wireless device based on the measured signal strengths from the plurality of devices at known locations and the estimated location. The location determination logic determines a revised estimated location based on the measured signal strengths and the revised transmit power for the wireless device.

In accordance with an example embodiment, there is disclosed herein, a method comprising obtaining signal strength measurements for a signal sent from a wireless device from a plurality of locations. A first estimated location is determined for a wireless device based on a predefined transmit power and the signal strength measurements made from a plurality of locations. An estimated transmit power is determined based on the first estimated location and the signal strength measurements made from the plurality of known locations. A revised estimated location is determined based on the signal strength measurements made from the plurality of known locations and the estimated transmit power In accordance with an example embodiment, there is disclosed herein logic encoded in at least one non-transitory tangible media for execution and when executed operable to determine a first estimated location for a wireless device based on a predefined transmit power for the wireless device and signal strength measurements made from a plurality of known locations of a signal from the wireless device. The logic is further operable to determine an estimated transmit power based on the first estimated location and the signal strength measurements made from the plurality of known locations. The logic determines a revised estimated location based on the signal strength measurements made from the plurality of known locations and the estimated transmit power.

DESCRIPTION OF EXAMPLE EMBODIMENTS

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

In an example embodiment, the signal strength of a wireless device is measured by a plurality of receiving devices, for example access points (APs). A first location estimate (est_loc) is made using a location algorithm f( ), an a priori transmit power(a_priori_tx_pow), measured AP (received signal strength indication) RSSI (ap_rssi), path loss model (pl_model), and AP information (ap_info) which may include but is not limited to AP positions, antenna type and antenna orientation. For example, the first location estimate may be defined as:

$$est\_loc = f(a\_priori\_tx\_pow, ap\_rssi, pl\_model, ap\_info)$$

Using the above location estimate, an estimate of the wireless device's transmit power is made for each AP involved in estimating the wireless device's location, est_tx_pow_per_AP_i, where I is the i th AP for each AP used in location calculation. For each measured AP the estimated transmit power can be expressed as:

$$est\_tx\_pow\_per\_AP\_i = f'(est\_loc, ap\_rssi\_i, pl\_model, ap\_info\_i)$$

where, ap_rssi_i is the measured RSSI from the i th AP; and ap_info_i is the i th AP information In an example embodiment, the estimated transmit power is the mean of the estimated transmit powers for each AP involved in estimating the wireless device's location, which is expressed as est_tx_pow=mean (est_tx_pow_per_AP_i). In other example embodiments, the estimated transmit power may be the median of the estimated transit powers, the minimum of the estimated transmit powers, the maximum of the estimated transmit powers, or any other statistic.

A revised estimate of the wireless device's location is made based on the estimated transmit power of the wireless device. In an example embodiment, this is expressed as:

$$est\_loc = f(est\_tx\_pow, ap\_rssi, pl\_model, ap\_info).$$

In particular embodiments, a heatmap difference may be employed in estimating the wireless device's location. For example, due to obstacles the predicted RSSI at a given location for a given AP will be different from the one obtained using the path loss model. These obstacles are taken into consideration during calibration phase, where data is collected to incorporate such local corrections to heatmaps (AP RSSI predictions over its coverage area). In these particular embodiments, the estimated transmit power is estimated as:

$$est\_tx\_pow\_AP\_i = ap\_rssi\_i - \text{heatmap}\_i(est\_loc);$$

where, $ap\_rssi\_i$ is the measured RSSI from the i th AP $\text{heatmap}\_i$ is the i th AP heatmap.

FIG. 1 illustrates a block diagram of a network 100 upon which an example embodiment may be implemented. APs 102, 104, 106 receive a signal from mobile device 108. APs 102, 104, 106 measures a signal parameter such as signal strength (for example received signal strength indication or "RSSI") of the received signal and forward the measurements via network 110 to location services server 112. In the illustrated example, location services server 112 is a standalone device but those skilled in the art should readily appreciate that location services server 112 may be embodied in any suitable infrastructure node. For example, location services server 112 may be embodied in one of APs 102, 104, 106. In an example embodiment, APs 102, 104, 106 may also send additional data such as antenna type, antenna gain, antenna orientation, etc. to location services server 112.

In an example embodiment, location services server 112 determines an estimated location for mobile device 108 based on the measured signal strengths and an a priori transmit power for the wireless device. In an example embodiment, the a priori transmit power is a minimum power setting for mobile device 108. For example, the a priori transmit power may be the minimum power for the protocol employed by mobile device 108. In another example embodiment, location services server 112 uses a maximum a priori power such as a the maximum allowed transmit power for a protocol employed by mobile device 108 and/or the maximum allowed transmit power set by a regulatory agency. In still yet another example embodiment, location services server 112 may determine an a priori transmit power for mobile device 108 based on what type of device mobile device 108 is. For example, if mobile device 108 is a cell phone, the a priori transmit power is a first transmit power, whereas if mobile device 108 is a gaming system the transmit power is a second transmit power.

Location services server 112 determines an estimated transmit power for wireless device 108 based on the signals received by each of APs 102, 104, 106 that is based on the measured signal strength, the estimated location and a path loss model, which in particular embodiments may include a heatmap difference. Location services server 112 determines a revised estimated transmit power based on the estimated transmit powers. In an example embodiment, the revised transmit power is the mean of the estimated transmit powers determined for APs 102, 104, 106. In another example embodiment, the revised transmit power is the median of the estimated transmit powers determined for APs 102, 104, 106. In yet another example embodiment, the revised transmit power is the minimum of the estimated transmit powers determined for APs 102, 104, 106. In still yet another example embodiment, the revised transmit power is the maximum of the estimated transmit powers determined for APs 102, 104, 106.

Location services server 112 determines a new (e.g., revised or updated) estimate for wireless device 108 based on the revised estimated transmit power and the measured signal strengths from APs 102, 104, 106. In an example embodiment, location services server 112 performs additional iterations of determining a revised transit power for mobile device 108 and determining a revised location for wireless device 108. The number of additional iterations may be a predetermined number and/or may continue until the revised location of wireless device 108 converges.

In the preceding example, measured signal strengths from three receiving devices (APs 102, 104, 106 in the illustrated example) were employed to determine the location of wireless device 108. The number of APs chosen for this example was merely for ease of illustration as those skilled in the art should readily appreciate that the principles set forth herein can be applied to any physically realizable number of receiving devices.

In other embodiments other signal parameters may be employed to provide the initial location estimate. For example, APs 102, 104, 106 may measure time of arrival (ToA) and location services server 112 determines from time difference of arrival (TDOA) an initial estimated location. Location services server 112 computes an estimated transmit power for each AP based on the estimated location of wireless device 108 and determines a transmit power based on a statistical analysis of the estimated transmit powers as described herein, and from the transmit power computes a revised location. Location services server 112 may also perform further iterations of computing a revised transmit power and revised location as described herein.

Figure 2:
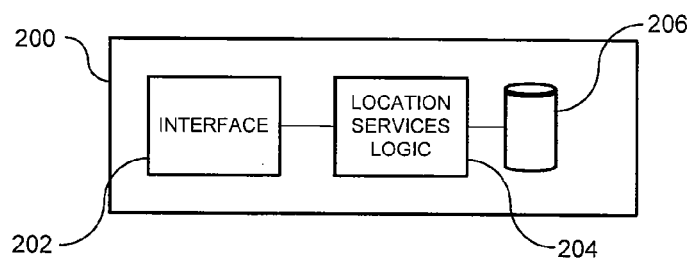
FIG. 2 illustrates a block diagram of an apparatus upon which an example embodiment may be implemented.

FIG. 2 illustrates a block diagram of an apparatus 200 upon which an example embodiment may be implemented. For example, apparatus 200 may be employed for implementing the functionality described herein for location services server 112 (FIG. 1). Apparatus 200 comprises an interface 202 suitable for receiving data such as measured signal strength data and/or data representative of received signal strength data. Location services logic 204 is coupled with interface 202 and receives measured signal strength data, and optionally other data including but not limited to location of devices making the measurements, antenna types, antenna gains, and/or antenna orientations. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software stored on a non-transitory, tangible medium which performs a described function when executed by a processor. Logic may suitably comprise one or more modules configured to perform one or more functions. In an example embodiment, apparatus 200 further comprises a lookup table 206.

In an example embodiment, location services logic 204 determines an estimated location for a wireless device based on the measured signal strengths received via interface 202 and an a priori transmit power for the wireless device. In an example embodiment, the a priori transmit power is a minimum power setting for wireless device. For example, the a priori transmit power may be the minimum power for the protocol employed by wireless device. In another example embodiment, location services logic 204 uses a maximum a priori power such as a the maximum allowed transmit power for a protocol employed by wireless device and/or the maximum allowed transmit power set by a regulatory agency. In still yet another example embodiment, location services logic 204 may determine an a priori transmit power for wireless device based on what type of device wireless device is. For example, if wireless device is a cell phone, the a priori transmit power is a first transmit power, whereas if wireless device is a gaming system the transmit power is a second transmit power. In this example embodiment, location services logic 204 may employ lookup table 206 to determine an a priori transmit power for the wireless device. For example, if the device is a cell phone, location services logic 206 determines the a priori transmit power from lookup table 206.

Location services logic 204 determines an estimated transmit power for the wireless device based on the signals received by each of APs 102, 104, 106 that is based on the measured signal strength, the estimated location and a path loss model, which in particular embodiments may include a heatmap difference. Location services logic 204 determines a revised estimated transmit power based on the estimated transmit powers. The estimated transmit powers may be determined any statistic. In an example embodiment, the revised transmit power is the mean of the estimated transmit powers determined for APs 102, 104, 106. In another example embodiment, the revised transmit power is the median of the estimated transmit powers determined for APs 102, 104, 106. In yet another example embodiment, the revised transmit power is the minimum of the estimated transmit powers determined for APs 102, 104, 106. In still yet another example embodiment, the revised transmit power is the maximum of the estimated transmit powers determined for APs 102, 104, 106. Other example embodiments may employ other statistical analysis such as estimated transmit power=mean (transmit power estimate per AP)−1.

Location services logic 204 determines a revised estimate for wireless device 108 based on the revised estimated transmit power and the measured signal strengths from APs 102, 104, 106. In an example embodiment, location services logic 204 performs at least one additional iteration of determining a revised transit power for wireless device and determining a revised location for wireless device 108. The number of additional iterations may be a predetermined number and/or may continue until the revised location of wireless device 108 converges.

Figure 3:
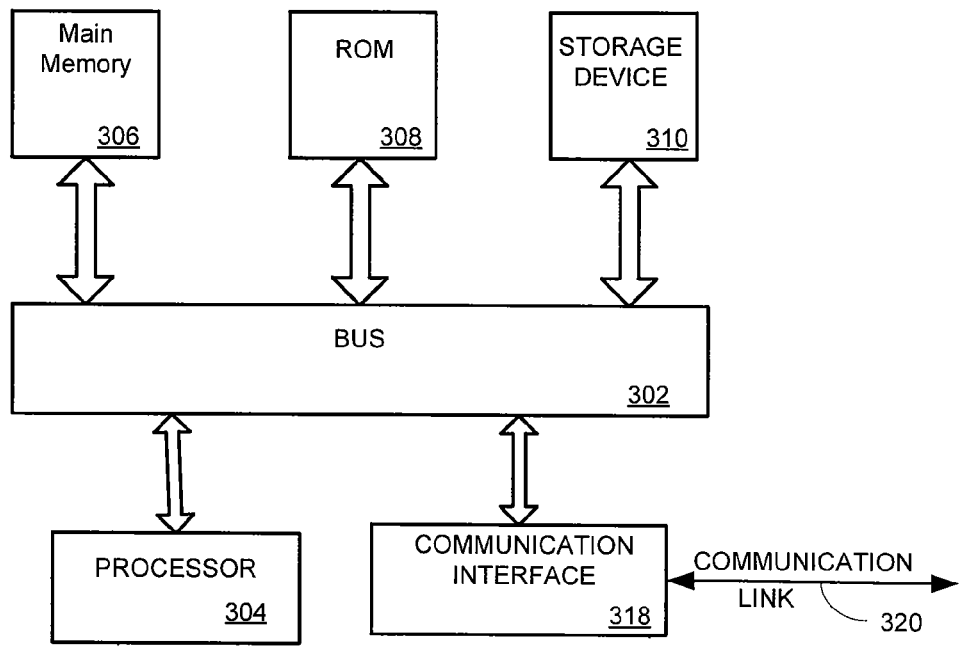
FIG. 3 illustrates a block diagram of a computer system upon which an example embodiment may be implemented.

FIG. 3 illustrates a block diagram of a computer system 300 upon which an example embodiment may be implemented. Computer system 300 is suitable for implementing the functionality of location estimation server 112 in FIG. 1 and/or location services logic 204 (FIG. 2).

Computer system 300 includes a bus 302 or other communication mechanism for communicating information and a processor 304 coupled with bus 302 for processing information. Computer system 300 also includes a main memory 306, such as random access memory (RAM) or other dynamic storage device coupled to bus 302 for storing information and instructions to be executed by processor 304. Main memory 306 also may be used for storing a temporary variable or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

An aspect of the example embodiment is related to the use of computer system 300 for performing location estimation for wireless devices. According to an example embodiment, location estimation for wireless devices is provided by computer system 300 in response to processor 304 executing one or more sequences of one or more instructions contained in main memory 306. Such instructions may be read into main memory 306 from another computer-readable medium, such as storage device 310. Execution of the sequence of instructions contained in main memory 306 causes processor 304 to perform the process steps described herein. One or more processors in a multi-processing arrangement may also be employed to execute the sequences of instructions contained in main memory 306. In alternative embodiments, hard-wired circuitry may be used in place of or in combination with software instructions to implement an example embodiment. Thus, embodiments described herein are not limited to any specific combination of hardware circuitry and software.

The term "computer-readable medium" as used herein refers to any medium that participates in providing instructions to processor 304 for execution. Such a medium may take many forms, including but not limited to non-volatile media, and volatile media. Non-volatile media include for example optical or magnetic disks, such as storage device 310. Volatile media include dynamic memory such as main memory 306. As used herein, tangible media may include volatile and non-volatile media. Common forms of computer-readable media include for example floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

Computer system 300 also includes a communication interface 318 coupled to bus 302. Communication interface 318 provides a two-way data communication coupling computer system 300 to external devices (not shown) via a communication link. For example, communication interface 318 may be a local area network (LAN) card to provide a data communication connection to a compatible LAN. As another example, communication interface 318 may be an integrated services digital network (ISDN) card or a modem to provide a data communication connection to a corresponding type of telephone line. Wireless links may also be implemented. In any such implementation, communication interface 318 sends and receives electrical, electromagnetic, or optical signals that carry digital data streams representing various types of information. Computer system 300 can send messages and receive data, including program codes, through the communication link 320, and communication interface 318.

Figure 4:
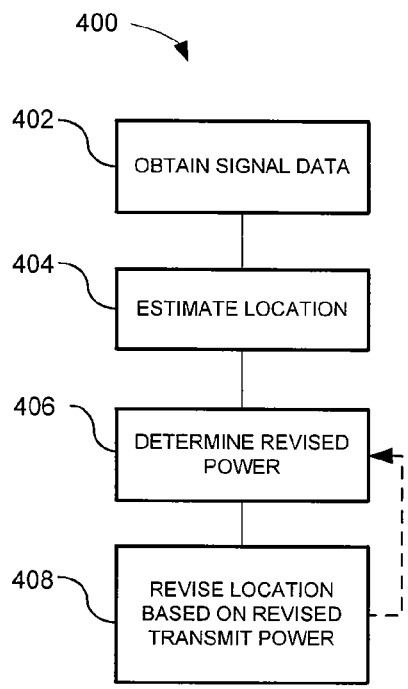
FIG. 4 illustrates a block diagram of a methodology in accordance with an example embodiment.

In view of the foregoing structural and functional features described above, a methodology 400 in accordance with an example embodiment will be better appreciated with reference to FIG. 4. While, for purposes of simplicity of explanation, methodology 400 of FIG. 4 is shown and described as executing serially, it is to be understood and appreciated that the example embodiment is not limited by the illustrated order, as some aspects could occur in different orders and/or concurrently with other aspects from that shown and described herein. Moreover, not all illustrated features may be required. Methodology 400 described herein is suitably adapted to be implemented in hardware, software, or a combination thereof. For example, methodology 400 may be implemented by location services server 112 (FIG. 1), location services logic 204 (FIG. 2) and/or processor 304 (FIG. 3).

At 402, signal data is obtained form a plurality of devices receiving a signal from a wireless device. The signal data may be signal strength, such as RSSI, and/or time of arrival (TOA). The receiving devices may be any suitable device operable to receive wireless signals such as APs, cell phone towers, or a combination of receiving devices. The location of the receiving devices is known. For example, the location of the receiving devices may be known by user input, self-calibration of the receivers, etc.

At 404, the location of the wireless device is determined. In an example embodiment, the location is based on a predefined, priori transmit power for the wireless device, the known locations of the receiving devices, measured signal strengths, and a path loss model. In particular embodiments, the path loss model may include a heatmap difference as described herein. In an example embodiment, the a priori transmit power is a minimum transmit power for the type of device and/or a minimum transmit power set by a regulatory authority. In another example embodiment, the a priori transmit power is the maximum transmit for the type of device and/or maximum transmit power set by a regulatory authority. In yet another example embodiment, the a priori transmit power is based on the type of device transmitting the signal, e.g., cell phone, wireless networking card, video device, gaming system, etc. In still yet another example embodiment, the location may be determined based on time difference of arrival (TDOA) or based on a combination of signal strength and TDOA.

At 406, an estimate of the transmit power of the wireless device is made for each device that provided signal strength measurements used in the determining the wireless device's location. The estimate of the transit power is based on the estimated location, the known location of the device receiving a signal from the wireless device, the signal strength measurement measured by the device, and the path loss model, which may also include a heatmap difference in particular embodiments. A revised transmit power is computed based on the estimated transmit powers calculated for each device receiving a signal from the wireless device involved in determining the wireless device's location. In an example embodiment, the revised transmit power is the mean of the estimated transmit powers. In another example embodiment, the revised transmit power is the median of the estimated transit powers. In yet another example embodiment, the revised transmit power is the minimum of the estimated transmit powers. In still yet another example embodiment, the revised transmit power is the maximum of the estimated transmit powers.

At 408, a revised estimate of the location is made based on the revised transit power calculated at 406, the signal strength measurements made from the plurality of known locations and the estimated transmit power. In particular embodiments, at least one additional iteration of computing a revised transmit power and a revised location based on the revised transmit power is performed as illustrated at 408. The number of iterations may be a pre-defined number and/or continue until the estimated location of the wireless device converges.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitably entitled.

The invention claimed is:

1. An apparatus, comprising:
an interface; and
location determination logic coupled with the interface;
wherein the location determination logic receives via the interface data representative of measured signal strengths of an associated wireless device measured by a plurality of associated receiving devices in operative communication with the apparatus and being disposed at known locations;
wherein the location determination logic determines an estimated location of the associated wireless device based on i) the data representative of the measured signal strengths measured by the plurality of associated receiving devices disposed at the known locations, and ii) a predetermined a priori transmit power for the associated wireless device;
wherein the location determination logic determines an estimated transmit power for the associated wireless device based on i) the data representative of the measured signal strengths measured by the plurality of associated receiving devices disposed at the known locations, and ii) the estimated location; and
wherein the location determination logic determines a revised estimated location for the associated wireless device based on i) the data representative of the measured signal strengths, and ii) the estimated transmit power for the wireless device.

2. The apparatus of claim 1, wherein:
the location determination logic determines a plurality of estimated transmit powers for the associated wireless device, each of the plurality of estimated transmit powers for the associated wireless device corresponding to a signal strength measured by each of the plurality of receiving devices;
the location determination logic determines a revised estimated transmit power for the associated wireless device based on a mean of the plurality of estimated transmit powers for the associated wireless device; and
the location determination logic determines the revised estimated location based on i) the revised estimated transmit power for the associated wireless device, and ii) the data representative of the measured signal strengths measured by the plurality of associated receiving devices disposed at the known locations.

3. The apparatus of claim 2, wherein the location determination logic employs a path loss model that includes a heatmap difference for determining the estimated transmit power for each of the plurality of associated receiving devices.

4. The apparatus of claim 1, wherein:
the location determination logic determines a plurality of estimated transmit powers for the associated wireless device, each of the plurality of estimated transmit powers for the associated wireless device corresponding to measured signal strengths measured by the plurality of receiving devices;
the location determination logic determines a revised estimated transmit power for the associated wireless device based on a median of the plurality of estimated transmit powers for the associated wireless device; and
the location determination logic determines the revised estimated location based on i) the revised estimated transmit power for the associated wireless device, and ii) the data representative of the measured signal strengths measured by the plurality of associated receiving devices disposed at the known locations.

5. The apparatus of claim 1, wherein:
the location determination logic determines a plurality of estimated transmit powers for the associated wireless device, each of the plurality of estimated transmit powers for the associated wireless device corresponding to a signal strength measured by each of the plurality of associated receiving devices; and
the location determination logic determines a revised estimated transmit power for the associated wireless device based on a minimum of the plurality of estimated transmit powers for the associated wireless device; and
the location determination logic determines the revised estimated location based on i) the revised estimated transmit power for the associated wireless device, and ii) the data representative of the measured signal strengths measured by the plurality of associated receiving devices disposed at the known locations.

6. The apparatus of claim 1, wherein:
the location determination logic determines a plurality of estimated transmit powers for the associated wireless device, each of the plurality of estimated transmit powers for the associated wireless device corresponding to the measured signal strengths for the plurality of associated receiving devices and estimated location; and
the location determination logic determines a revised estimated transmit power for the associated wireless device based on a maximum of the plurality of estimated transmit powers for the associated wireless device.

7. The apparatus of claim 1, wherein the location determination logic employs a predefined minimum value for the a priori transmit power.

8. The apparatus of claim 1, wherein the location determination logic employs a predefined maximum value for the a priori transmit power.

9. The apparatus of claim 1, wherein the location determination logic employs a lookup table to determine a default a priori transmit power for a type of device corresponding to the wireless device.

10. The apparatus of claim 1, wherein the location determination logic repeats determining the revised estimated transmit power and determining the revised estimated location a predetermined number of times.

11. The apparatus of claim 1, wherein the location determination logic repeats determining the revised estimated transmit power and determining the revised estimated location until the revised estimated location converges.

12. The apparatus of claim 1, wherein the data representative of measured signal strengths is a received signal strength indication.

13. The apparatus of claim 1, wherein the location determination logic employs a path loss model and a heatmap difference for determining an estimated transmit power for each of the plurality of associated receiving devices.

14. A method, comprising:
obtaining signal strength measurements for a signal sent from an associated wireless device measured by a plurality of associated access points disposed at a respective plurality of known locations;
determining by a processor a first estimated location of the associated wireless device based on i) a predetermined a priori transmit power for the associated wireless device, and ii) the signal strength measurements measured by the plurality of associated access points disposed at the plurality of known locations;
determining by the processor an estimated transmit power for the associated wireless device based on i) the first estimated location, and ii) the signal strength measurements measured by the plurality of associated access points disposed at the plurality of known locations; and
determining, by the processor, a revised estimated location for the associated wireless device based on i) the signal strength measurements measured by the plurality of associated access points disposed at the plurality of known locations, and ii) the estimated transmit power.

15. The method of claim 14, wherein the determining an estimated transmit power for the associated wireless device comprises:
estimating a transmit power for the associated wireless device for each of the plurality of known locations where the signal was received; and
determining a mean of the estimated transmit powers from each of the plurality of known locations.

16. The method of claim 14, wherein the determining the estimated transmit power for the associated wireless device comprises:
estimating a transmit power for the associated wireless device for each of the plurality of known locations where the signal was received; and
wherein the estimated transmit power is the minimum estimated transmit power for the plurality of known locations.

17. The method of claim 14, further comprising:
determining a revised first estimated transmit power for the associated wireless device based on i) the first estimated location and ii) the signal strength measurements measured by the plurality of associated access points disposed at the respective plurality of known locations; and
determining a revised estimated location based on i) the signal strength measurements measured by the plurality of associated access points disposed at the respective plurality of known locations, and ii) the revised first estimated transmit power.

18. The method of claim 17, further comprising repeating determining the revised first estimated transmit power and determining the revised estimated location until the estimated location converges.

19. The method of claim 14, wherein the determining the estimated transmit power comprises:
estimating a transmit power for each of the plurality of known locations where a signal was received from the associated wireless device; and
determining a median of the estimated transmit powers from each of the plurality of known locations.

20. Logic encoded in at least one non-transitory tangible media for execution and when executed operable to:
obtain from a plurality of access points disposed at a plurality of known locations signal strength measurements for a signal sent from a wireless device;
determine a first estimated location for the wireless device based on a predetermined a priori transmit power for the wireless device, and the signal strength measurements obtained from the plurality of access points disposed at the plurality of known locations;
determine an estimated transmit power for the wireless device based on the first estimated location, and the signal strength measurements received from the plurality access points disposed at the plurality of known locations; and
determine a revised estimated location for the wireless device based on the signal strength measurements obtained from the plurality of access points disposed at the plurality of known locations, and the estimated transmit power.

21. Logic encoded in at least one non-transitory tangible media for execution and when executed operable to:
 obtain from a plurality of access points at a plurality of known locations a plurality of signal strength measurements and a plurality of time difference of arrival data for a signal sent from a wireless device;
 determine a first estimated location for the wireless device based on the plurality of angle of arrival measurements;
 determine an estimated transmit power for the wireless device based on the first estimated location, and the plurality of signal strength measurements received from the plurality of access points disposed at the plurality of known locations; and
 determine a revised estimated location for the wireless device based on the plurality of signal strength measurements obtained from the plurality of access points disposed at the plurality of known locations, and the estimated transmit power.

* * * * *